UNITED STATES PATENT OFFICE.

AUGUST LEOPOLD LASKA, OF OFFENBACH-ON-THE-MAIN, GERMANY, ASSIGNOR TO THE CORPORATION OF CHEMISCHE FABRIK GRIESHEIM ELEKTRON, OF FRANKFORT-ON-THE-MAIN, GERMANY.

DISAZO DYES AND PROCESS OF MAKING SAME.

1,001,286. Specification of Letters Patent. Patented Aug. 22, 1911.

No Drawing. Application filed February 9, 1911. Serial No. 607,603.

*To all whom it may concern:*

Be it known that I, AUGUST LEOPOLD LASKA, doctor of philosophy, chemist, a subject of the German Emperor, and resident of Offenbach-on-the-Main, in the Grand Duchy of Hessen, Germany, with the post-office address Dreieichring No. 18, have invented new and useful Improvements in Disazo Dyes and Processes of Making the Same, of which the following is a specification.

I have found that reddish yellow to orange red disazo dyestuffs can be obtained by combining the tetrazo compound of orthodichlorobenzidin ($NH_2:Cl=1:2$) with two molecular proportions of 1-aryl-3-methyl-5-pyrazolone. The thus obtained dyestuffs may be used preferably in the manufacture of pigment colors, as they are insoluble in water and oil.

The new disazo dyestuffs correspond to the general formula:

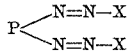

wherein P stands for the radical dichlorodiphenyl ($N=N-:Cl-1:2$) and X for 1-aryl-3-methyl-5-pyrazolone.

The color lakes obtained from the new dyestuffs are very fast to light and have a great covering power.

The following example will serve to illustrate the nature of my invention; parts being by weight.

Example: 25.3 parts of ortho-dichlorobenzidin are dissolved in 1000 parts of hot water and 85 parts of hydrochloric acid. The solution is strained if necessary and diazotized after cooling with ice by means of 14.4 parts of sodium nitrite. The diazo solution is poured into a solution of 38 parts of methylphenylpyrazolone in 1000 parts of water and 30 parts of hydrochloric acid 20° Bé. A solution of 140 parts of sodium acetate is added and the mixture stirred till the formation of dyestuff is completed. The dyestuff is separated during the combination in shape of orange flakes. It is filtered off, washed out and used preferably in form of a paste. The dyestuff is in dry state a bright orange-red powder, insoluble in water, soluble in concentrated sulfuric acid with red color. It can be transformed into color lakes of orange tints in the usual manner. These lakes show an excellent fastness against water and oil.

Of course the preparation of the dyestuff can be performed in presence of a substratum also.

The formation of dyestuffs with homologues and products of substitution of methyl-phenyl-pyrazolone may be carried out in the same manner.

The products substituted in orthoposition to the pyrazolone-nitrogen atom show more yellowish tint.

Now what I claim and desire to secure by Letters Patent is the following:

1. The process for the production of disazo dyestuffs specially suitable for the preparation of pigment colors, consisting in combining the tetrazo compound of ortho-dichlorobenzidin ($NH_2:Cl:1:2$) with two molecular proportions of 1-aryl-3 methyl-5-pyrazolone.

2. As new articles the disazo dyestuffs, which dyestuffs are in dry state yellow red to red powders, entirely insoluble in water soluble in concentrated sulfuric acid with yellow-red to red color and yielding upon reduction with stannous chlorid and hydrochloric acid o-dichlorobenzidin and 4-amino-1-aryl-3-methyl-5-pyrazolone; which dyestuffs can easily be transformed in color lakes of reddish yellow to orange red tints, being very fast against oil and water.

3. The process for the production of a new disazo dyestuff specially suitable for the preparation of pigment colors, consisting in combining the tetrazo compound of orthodichloro-benzidin with two molecular proportions of 1-phenyl-3-methyl-5-pyrazolone.

4. As a new article the disazo dyestuff, which dyestuff is in dry state a bright orange-red powder, entirely insoluble in water, soluble in concentrated sulfuric acid with red color yielding upon reduction with stannous chlorid and hydrochloric acid o-dichlorobenzidin and 4-amino-1-phenyl-3-methyl-5-pyrazolone; which dyestuff can easily be transformed in a color lake of orange tint, being very fast against oil and water.

In testimony, that I claim the foregoing as my invention, I have signed my name in presence of two witnesses, this twenty-sixth day of January 1911.

AUGUST LEOPOLD LASKA.

Witnesses:
HERMANN WEIL,
ROBERT BÜHL.